United States Patent Office

3,168,484
Patented Feb. 2, 1965

3,168,484
PRODUCTION OF POLYMERIZATION CATALYST
Willem F. Engel, Pieter Krijger, and Simon Mostert, all of Amsterdam, Netherlands, assignors to Shell Oil Company, New York, N.Y., a corporation of Delaware
No Drawing. Filed Apr. 26, 1961, Ser. No. 105,543
Claims priority, application Netherlands, May 20, 1960, 251,822
6 Claims. (Cl. 252—429)

This invention relates to an improved process for the production of polymerization catalyst. More particularly, the invention relates to an improved process for preparing catalysts which are particularly suitable for polymerization of ethylenically unsaturated hydrocarbons in a fluidized bed.

Specifically, the invention provides a process for the production of a fluidizable catalyst composition suitable for the polymerization of ethylenically unsaturated hydrocarbons which comprises contacting an aluminum alkyl compound with a compound selected from the group consisting of vanadium and titanium trihalides and mixtures thereof in the presence of a solid fluidized inert diluent or carrier, said aluminum alkyl compounds and trihalides being contacted at a rate such that the free-flowing powder of the trihalides is continually preserved. The invention also provides a process for using the new catalysts for the polymerization of ethylenically unsaturated hydrocarbons.

It is known that polymers of olefins may be prepared by contacting the olefins in the gaseous state and in the absence of a liquid diluent with a fixed catalyst which is a reaction product of a solid compound of a transition metal of Groups IV to VI with a metal alkyl compound of a metal of Groups I to III of the Periodic Table. It is also known that such polymerization may be performed in a fluidized bed. The catalyst is obtained by combining, for example, titanium trichloride with calcined common salt (NaCl) and a solution of an aluminum triethyl in pentane. The required fine degree of distribution requires grinding with steel balls for many hours. This method of producing the catalyst is very cumbersome and inefficient and consequently unattractive.

It is an object of the invention to prepare improved polymerization catalysts. It is another object of the invention to provide an improved process for preparing polymerization catalysts. It is another object to provide an improved process for the production of fluidizable catalysts suitable for the polymerization of unsaturated hydrocarbons. It is a further object to provide an improved process of polymerizing unsaturated hydrocarbons in the absence of a liquid medium. It is still a further object to prepare free-flowing gas phase polymerization catalyst. It is still a further object to provide a process for preparing catalysts which requires no grinding process. Other objects and advantages of the invention will become apparent to one skilled in the art from the accompanying disclosure and discussion.

It has been discovered that these and other objects may be accomplished by the process for the production of a fluidizable catalyst composition suitable for the polymerization of ethylenically unsaturated hydrocarbons which comprises contacting an aluminum alkyl compound with a compound selected from the group consisting of vanadium and titanium trihalides and mixtures thereof in the presence of a solid fluidized inert diluent or carrier, said aluminum alkyl compounds and trihalides being contacted at a rate such that the free-flowing powder of the trihalides is continually preserved.

It has also been found that this special method for preparing polymerization catalysts provides an easier process in which the titanium and/or vanadium trihalides and solid inert diluents are continually maintained as a free-flowing powder while the catalyst is being produced. This process eliminates the time-consuming grinding process heretofore required.

The easiest way of preventing agglomeration of the catalyst particles is to first absorb the aluminum alkyl compounds on the surface of the solid inert diluents and then mix these diluents with the vanadium and/or titanium trihalides. The adsorbed aluminum alkyl compounds are only very gradually given off by the adsorbents even at the elevated temperatures used in the polymerization process; hence, they only come very gradually into contact with the trihalides, thereby insuring that the character of readily flowing powder is preserved.

It is, however, also possible to contact the aluminum alkyl compounds with a mixture of one or more trihalides of titanium and/or vanadium and one or more solid inert diluents. In this case the rate of addition of the aluminum alkyl compounds should be controlled and the mixture stirred in order to prevent high concentrations and any locally high concentrations of the aluminum alkyl compounds. The said high concentrations would cause a violent reaction with the trihalides and hence agglomeration of the particles, as a result of which the character of readily flowing powder would be lost. The permissible rate of addition may be readily determined experimentally in each particular case. The criterion to be observed of ready flow of the powdery mixture is entirely objective, in other words, it would be obvious to one skilled in the art when such a permissible rate of addition is achieved.

A porous material is preferably used as the solid inert diluent or catalyst carrier. Various inorganic materials may be used, such as, for instance, various materials usually employed as catalyst supports, e.g., silica gel, kieselguhr, alumina or pumice powder, metal oxides, such as calcium oxide or magnesium oxide, and salts, such as sodium tripolyphosphate or calcium carbonate. Silica gel is very satisfactory. Sodium tripolyphosphate, however, is particularly suitable as it is soluble in water and can therefore be readily removed from the polymer to be produced. In addition to porous materials other solid inert diluents may be used, e.g., such salts as common salt (sodium chloride). Moreover, such organic materials may be employed as solid polymers of the same type as those which it is intended to produce and with which the catalyst is therefore already mixed before polymerization is begun. The expression "inert" means with no or without practically any harmful effect on the aluminum alkyl compounds and not disturbing with respect to the polymerization reaction.

It is preferred to contact the aluminum alkyl compounds in the gaseous state with the solid inert diluents, if necessary, with the mixtures of trihalides with the solid inert diluents. In many cases the vapor of an aluminum compound will be used in admixture with inert gas such as nitrogen.

Instead of in the gaseous state the aluminum alkyl compounds may also be contacted with the solid inert diluents in the liquid state, for example, dissolved in an inert solvent. This may be done contingently with the mixtures of trihalides with the solid inert diluents, that is, the aluminum alkyl compounds may be contacted with the solid inert diluents before, concurrently with or subsequently to the contacting with the vanadium and/or titanium trihalides. Various hydrocarbons are suitable as the inert solvent. Preferred solvents are the normally liquid saturated hydrocarbons, such as, for example, pentane, isopentane, hexane, isohexane, heptane, octane, and the like. The liquid or dissolved aluminum alkyl compounds may also be used in the form of a mist or they may be atomized and applied in this state to the solid inert diluents contingently with the trihalides.

During the adsorption of the aluminum alkyl compounds on the solid particles movement of the solid particles is desirable in order to promote uniform distribution of the aluminum alkyl compounds. Uniform distribution is particularly important when in addition to a solid inert diluent a trihalide of titanium or vanadium is present. The movement may be insured by mechanical stirring devices, but it is much easier and very effective to cause movement by means of a gas stream, preferably in such a way that the solid particles already in this state form a fluidized bed. For fluidization use may be made of an inert gas, for example, nitrogen, or otherwise a gas mixture containing both one or more inert gases and the vapors of one or more aluminum alkyl compounds.

The aluminum alkyl compounds may be aluminum trialkyls such as, for example, trimethyl aluminum, triethyl aluminum, triisobutyl aluminum, and the like, or they may be compounds in which the aluminum is bound not only to one or two alkyl groups but also to two or one halogen atom such as, for example, dimethyl aluminum chloride, diethyl aluminum chloride, diethyl aluminum bromide, dibutyl aluminum fluoride, diisobutyl aluminum chloride, ethyl aluminum dichloride, ethyl aluminum dibromide, butyl aluminum dichloride, ethyl aluminum sesquihalide (mixture of diethyl aluminum chloride and ethyl aluminum dichloride) and mixtures thereof.

The alkyl groups in the aluminum compounds may be either straight-chain or branched. In general, the alkyl groups may contain up to 12 carbon atoms with the alkyl groups having from 2 to 5 carbon atoms being preferred. Especially preferred are ethyl groups. The halogen atoms in the aluminum alkyl compounds, as well as those in the trihalides of titanium and vanadium are preferably chlorine and bromine with chlorine being especially preferred.

Various modifications may be used of the trihalides of titanium and vanadium. If desired, these trihalides may be present on the surface of granules of solid inert material. They may be deposited thereon in a previous treatment by reducing vaporous tetrachlorides in contact with these granules. The reduction is obtained, for example, by mixing with aluminum alkyl compounds which are also vaporous.

The molar ratio of aluminum compound(s) to trihalide(s) may be greatly varied. This ratio is generally in the range of from 0.1 to 10. The amount of solid inert diluent is such that the surface of the amount is sufficient for adsorbing the amount in which the aluminum alkyl compound is used. The greater the specific surface area of the solid inert diluent, the smaller may be the amount thereof. If desired, more solid inert diluent may be used than the minimum amount required, for example, 1.5 times to twice this amount.

Before the catalyst system is contacted with the ethylenically unsaturated hydrocarbons, it is advisable to heat it for some time, for example, to temperatures in the range of from 40° to 80° C. for a few minutes to about one hour.

As far as possible, the catalyst should be prepared, stored and transported in the absence of oxygen and moisture.

The production of the catalyst and its use in the polymerization does not generally take place in the same space.

The ethylenically unsaturated hydrocarbons suitably polymerized by the catalyst of this invention are preferably the alpha-olefins such as, for example, ethylene, propylene, butylene and the like; however, compounds having more than one unsaturated bond may also be polymerized such as, for example, butadiene, isoprene, piperylene, dimethyl butadiene, ethyl butadiene, and other conjugated dienes. The polymerization process may be homopolymerization or may be copolymerization by use of mixtures of two or more olefinic compounds and such polymerization takes place in the complete or substantially complete absence of a liquid medium or a liquid diluent.

In order to polymerize ethylenically unsaturated hydrocarbons according to the invention, they are contacted in the gaseous state with the present catalysts. Although this contact may be effected in any possible way, a fluidized bed is preferred for this purpose, as was already stated above. The fluidized bed consists of polymer, catalyst and generally one or more inorganic, solid, inert diluents. Particles of these components are kept in motion by an upward gas stream. To this end the hydrocarbon to be polymerized, or a gaseous mixture containing this hydrocarbon, is blown into the bottom of the polymerization reactor.

Although the polymerization may be effected batchwise in this manner, a continuous process is preferred in which in addition to monomer catalyst is continuously supplied to the reaction space, and, on the other hand, polymer and hence also catalyst are withdrawn from this space.

During polymerization it is advisable for gaseous aluminum alkyl compound to be passed into the fluidized bed in which polymerization occurs. To this end the aluminum alkyl compound may be added to the gas or gas mixture by which the bed is kept in a fluidized state. This extra addition of aluminum alkyl compound may considerably increase the polymerization rate.

In order to start a polymerization process in which use is made of a fluidized bed, a fluidized bed of a solid, inert material is generally first formed in the polymerization reactor. The catalyst (which itself already contains a solid, inert diluent) is added to the resultant bed. The said inert, solid material with which the fluidized bed is begun in the polymerization reactor is preferably polymer which is identical with the product envisaged, or otherwise a material which can be readily removed from the product envisaged, for instance, a water-soluble salt, such as common salt. It is also advisable to apply an amount of aluminum alkyl compound to the inert, solid material with which the fluidized bed is started in the polymerization reactor.

The amount of the solid, inert material required to form a fluidized bed in the polymerization reactor may be very considerable as compared to the quantity of the catalyst. This amount obviously increases with an increasing horizontal cross-section of the reactor. The dimensions of the reactor determine the amount of polymer which can be formed therein and hence the amount of catalyst required.

The temperatures at which ethylenically unsaturated hydrocarbons may be polymerized in the process according to the invention may vary greatly according to circumstances. These temperatures are generally in the range of from 0° to 100° C., but exceptionally also higher than 100° C. or lower than 0° C. The pressure may also be varied within wide limits. Atmospheric and higher (e.g., 1–50 atm. abs.) or sub-atmospheric pressures are possible.

The following examples illustrate the present invention. It is to be understood that the examples are for the purpose of illustration and the invention is not to be regarded as limited to any of the specific compounds or conditions recited therein.

EXAMPLE I

*Production of the catalyst*

The catalyst was composed of gamma-TiCl$_3$, aluminum diethyl chloride and silica gel.

The silica gel was dried at 500° C. for half an hour and then cooled off at room temperature. For each test a quantity of 5 g. of silica gel was fluidized in an atmosphere of dry oxygen-free nitrogen by means of an upward stream of this gas. During the course of one hour a solution of aluminum diethyl chloride in iso-octane was added dropwise, this solution containing 2 moles of aluminum diethyl chloride per liter. The solvent was evaporated by the nitrogen stream, the character of fluidized bed being preserved. Finally, dry $TiCl_3$ was added. The amounts of aluminum and titanium compounds deposited in the silica gel are indicated in the table below.

The mixture was held at 60° C. for 10 minutes, invariably in a fluidized state, and then transferred to the polymerization reactor, which already contained common salt and aluminum diethyl chloride.

Polymerization

In each experiment 100 g. of dry NaCl were first fluidized in an atmosphere of dry oxygen-free nitrogen in the polymerization reactor by means of an upward stream of this gas. In the course of one hour 10 ml. of the above-mentioned solution of aluminum diethyl chloride were gradually added dropwise, the solvent evaporating and the common salt remaining in a fluidized state. The catalyst was then added.

The nitrogen stream was replaced by the propylene stream. Temperature and pressure in the separate experiments were adjusted as specified in the table below. This also shows the ratio of $Al/SiO_2$ and $Al/Ti$ in the catalyst (the aluminum compound applied to NaCl not being included), the polymer production in grams per millimole of $TiCl_3$ per hour and some properties of the products. The intrinsic viscosity (I.V.) was determined by viscosity measurements of solutions of the products in decahydronaphthalene at 120° C. The percentage of soluble polymer was determined by extraction with boiling hexane; this percentage is a measure of the amorphous part of the product. The impact strength was measured according to the British Standards Izod Impact Strength Test and expressed in kg. cm./cm.² The Melt Index (M.I.) was determined according to ASTM D1238–52T.

| $Al/SiO_2$, mmol/g. | $Al/Ti$, mmol/mmol | Temp., °C. | Press., Atm. Abs. | Products g./mmol per hour $TiCl_3$ | I.V. | Soluble, Wt. % | Impact Strength kg.-cm./cm.² | M.I. | Yield Stress, kg./cm.² |
|---|---|---|---|---|---|---|---|---|---|
| 2.40 | 3.00 | 78 | 7.5 | 12.2 | 6.1 | 3.0 | 18.7 | 0.08 | 328 |
| 2.40 | 2.70 | 78 | 5.4 | 13.8 | 5.4 | 1.3 | 13.9 | 0.14 | 344 |
| 2.40 | 2.90 | 78 | 3.9 | 7.0 | 4.2 | 1.5 | ---- | ---- | 359 |
| 2.00 | 2.29 | 81 | 7.0 | 8.8 | 6.0 | 2.0 | 19.4 | 0.03 | 305 |
| 2.40 | 2.42 | 85 | 4.9 | 9.2 | 4.0 | 6.0 | 15.6 | 0.38 | 273 |
| 2.40 | 2.96 | 86 | 6.9 | 10.2 | 4.2 | 2.0 | ---- | 0.35 | 325 |
| 2.40 | 2.13 | 96 | 6.9 | 6.6 | 3.0 | 3.0 | ---- | ---- | ---- |
| 2.40 | 3.28 | 98 | 5.0 | 9.2 | 2.0 | 3.0 | ---- | ---- | 300 |
| 2.40 | 2.10 | 99 | 7.0 | 10.2 | 2.6 | 2.0 | ---- | 3.50 | 311 |
| 2.26 | 2.40 | 97 | 3.0 | 3.2 | 1.7 | 0.3 | ---- | ---- | 344 |

EXAMPLE II

This example relates to experiments in which, except for the following differences, the conditions were as in Example I. No separate amount of aluminum compound was applied to the fluidized bed of NaCl. The amount of NaCl was varied, as was also the duration of heating the catalyst at 60° C.

EXAMPLE III

Active catalysts could also be produced by using other solid, inert diluents as carriers instead of silica gel. These catalysts were produced in the same way as in Example I. Ratios of components are shown in the following table. The rates of polymer production with these catalysts per mmol of $TiCl_3$ and per hour were approximately equal to those of Example I.

| Inert Solid Material | Al/Inert Material, mmol/g. | Al/Ti, mmol/mmol | Duration of Heating to 60° C., Minutes |
|---|---|---|---|
| Na tripolyphosphate | 0.4 | 1.7 | 10 |
|  | 0.8 | 3.7 | 10 |
| CaO | 1.6 | 0.9 | 20 |
|  | 1.3 | 1.3 | 20 |
|  | 2.0 | 1.6 | 15 |
| $Al_2O_3$ | 0.2 | 0.7 | 10 |
|  | 1.4 | 6.2 | 10 |
| Polypropylene | 6 | 5.3 | 10 |
|  | 6 | 4.3 | 10 |
|  | 4 | 3.5 | 10 |
|  | 6 | 3.3 | 10 |
|  | 6 | 1.9 | 10 |

We claim as our invention:

1. A process for the production of a fluidizable catalyst composition suitable for the polymerization of ethylenically unsaturated hydrocarbons which comprises contacting an aluminum alkyl compound with a compound selected from the group consisting of vanadium and titanium trihalides and mixtures thereof in the presence of a solid fluidized inert diluent, said aluminum alkyl compound and trihalides being contacted at a rate such that the free-flowing powder of the trihalides is continually preserved.

2. A process as in claim 1 wherein the aluminum alkyl compound is adsorbed on the surface of the solid inert diluents before the diluents are contacted with the trihalides.

3. A process as in claim 1 wherein the solid inert diluent is silica gel.

4. A process as in claim 1 wherein the solid inert diluent is sodium tripolyphosphate.

5. A process as in claim 1 wherein the aluminum alkyl compounds are contacted in the gaseous state with the solid inert diluents.

6. A process for the production of a fluidizable catalyst composition suitable for the polymerization of ethyl-

| $Al/SiO_2$, mmol/g. | $Al/Ti$, mmol/mmol | NaCl, Gram | Duration of Heating of Catalyst Minutes | Polymerization Temp., °C. | Pressure, Atm. Abs. | Polymer Production, g./mmol $TiCl_3$ per hour | I.V. | Soluble Wt. Percent |
|---|---|---|---|---|---|---|---|---|
| 2.40 | 2.22 | 200 | 20 | 65 | 7.5 | 7.4 | 5.4 | 8 |
| 2.50 | 2.57 | 100 | 20 | 75 | 6.9 | 3.8 | 4.5 | 12 |
| 2.53 | 1.80 | 100 | 25 | 78 | 7.0 | 3.6 | 4.7 | 11 |
| 1.62 | 2.00 | 100 | 30 | 78 | 7.1 | 3.4 | 3.0 | 12 |
| 2.53 | 2.21 | 100 | 15 | 78 | 7.6 | 3.3 | ------ | 16 | enically unsaturated hydrocarbons which comprises fluidizing a solid inert diluent in an upward stream of a gas and contacting an aluminum alkyl compound and a compound selected from the group consisting of vanadium and titanium trihalides and mixtures thereof, said aluminum alkyl compound and trihalides being contacted in the presence of the fluidized diluent at a rate such that the resulting catalyst composition is continually preserved as a free-flowing powder.

References Cited by the Examiner
UNITED STATES PATENTS

| | | | |
|---|---|---|---|
| 2,634,260 | 4/53 | Carnahan | 260—93.7 |
| 2,890,212 | 6/59 | Murray | 260—93.7 |
| 2,925,392 | 2/60 | Seelbach et al. | 252—429 |
| 2,956,994 | 10/60 | Peterlein | 252—429 |
| 2,976,253 | 3/61 | Edwards | 252—429 |
| 2,980,662 | 4/61 | Jezl | 252—429 |
| 2,981,725 | 4/61 | Luft et al. | 252—429 |
| 2,989,516 | 6/61 | Schneider | 252—429 |
| 3,008,943 | 11/61 | Guyer | 252—429 |
| 3,031,514 | 4/62 | Kosmin | 252—429 |
| 3,042,626 | 7/62 | Bruce et al. | 252—429 |

FOREIGN PATENTS 910,261  11/62  Great Britain.

TOBIAS E. LEVOW, *Primary Examiner.*
JULIUS GREENWALD, SAMUEL H. BLECH,
*Examiners.*